United States Patent [19]

Min

[11] Patent Number: 5,175,716
[45] Date of Patent: Dec. 29, 1992

[54] METHOD FOR SEARCHING A TRACK AT HIGH SPEED IN AN OPTICAL RECORDING/REPRODUCING APPARATUS

[75] Inventor: Kyoung-Seo Min, Busan, Rep. of Korea

[73] Assignee: Samsung Electronics Co., Ltd., Suwon, Rep. of Korea

[21] Appl. No.: 677,472

[22] Filed: Mar. 29, 1991

[30] Foreign Application Priority Data

Apr. 16, 1990 [FR] France .............................. 1990-5245

[51] Int. Cl.⁵ .................................................. G11B 7/00
[52] U.S. Cl. ................................... 369/44.11; 369/32; 369/44.28
[58] Field of Search ................. 369/33, 41, 43, 44.07, 369/44.29, 44.34, 44.35, 44.11, 44.12, 44.26, 44.28, 44.32, 44.41, 44.42, 32, 54, 58; 360/78.09, 78.11, 78.14

[56] References Cited

U.S. PATENT DOCUMENTS 4,858,214  8/1989  Baba ........................... 369/44.28 X
4,926,405  5/1990  Hangai et al. ............... 369/44.11 X

FOREIGN PATENT DOCUMENTS 0304299  2/1989  European Pat. Off. ......... 369/44.07

Primary Examiner—Roy N. Envall, Jr.
Assistant Examiner—Muhammad Edun
Attorney, Agent, or Firm—Robert E. Bushnell

[57] ABSTRACT

There is disclosed a method of searching at high speed an information recorded on a compact disk in an optical recording/reproducing apparatus, by means of detecting the numbers of current tracks and tracks of the target position and converting the detected value of the tracks to a value of time corresponding to velocity. In the compact disk system, the number of track required to be move the target position is obtained by detecting the numbers of the current and target tracks. The number of tracks obtained is converted as the value of time, and the sled motor in pick-up tools is driven according to the obtained value of time, and then the break point is settled at the point of ¾ of the time driven in the sled motor, and finally the target track is detected at high speed after passing over the point of ¼.

4 Claims, 4 Drawing Sheets

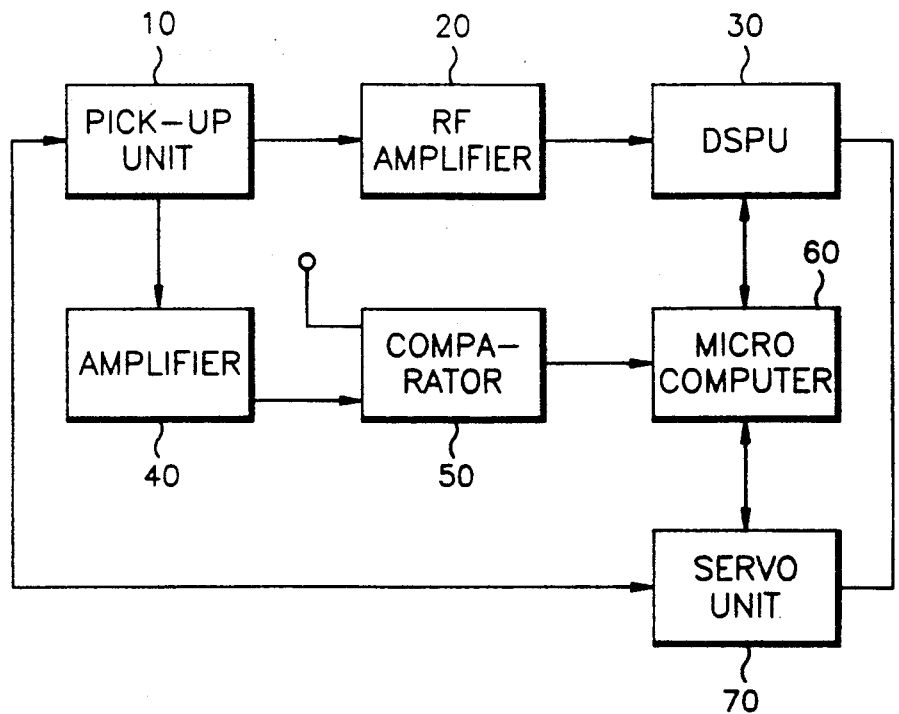
*FIG. 3*
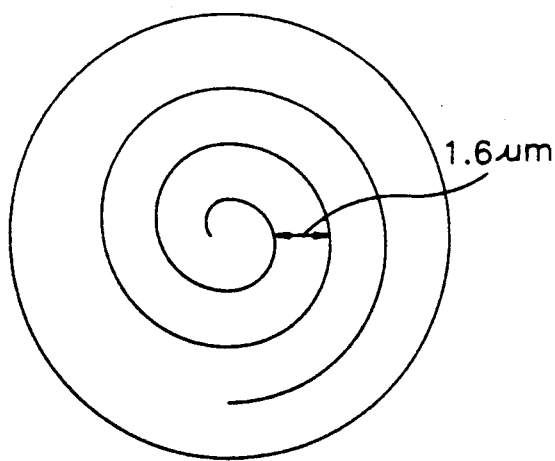 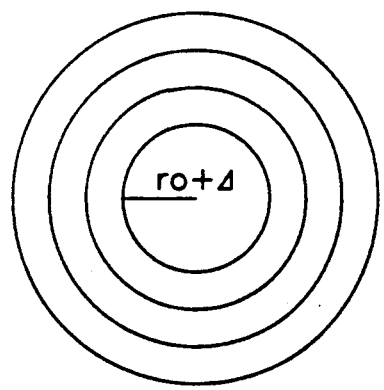
*FIG. 4A*   *FIG. 4B*

METHOD FOR SEARCHING A TRACK AT HIGH SPEED IN AN OPTICAL RECORDING/REPRODUCING APPARATUS

BACKGROUND OF THE INVENTION

The present invention relates to a method for high-speed searching in an optical recording/reproducing apparatus, particularly to a method for finding out a target track by of transforming the number of the tracks to be moved in a compact disk to a value of time by velocity.

An optical recording/reproducing apparatus, in general, refers to a compact disk player which has been widely propagated, a video disk player and compact disk ROM(namely, CD-ROM) which is an apparatus for recording data.

Within such an optical recording/reproducing apparatus several servo systems are employed to provide the reading-out information from the disk. The several servo systems include a tracking servo for tracking, a focusing servo, a sled servo(or radial servo) for transferring an optical apparatus into the circumference of a disk, and a rotary servo for rotating a disk.

FIG. 1 shows a block diagram of the optical recording/reproducing apparatus as described above.

The apparatus in FIG. 1 consists of a pick-up unit 12 for picking up recording information on a disk 10 a radio-frequency amplifier 14 for amplifying the signal picked up by the pick-up unit 12, a signal processing unit 16 for filtering the pulse of an output signal from the radio-frequency amplifier 14 and for demodulating with eight to fourteen modulation (EFM), a servo unit 18 for inputting the output signal of the radio-frequency amplifier 14 and the EFM waveform reshaping signal of the signal processing unit 16 and for outputting a control signal for the tracking, focusing and the sled servo, and a disk motor driving control signal, a sled motor driving unit 22 for driving the sled motor of the pick-up unit 12 by inputting the sled servo control signal generated from the servo unit 18, an actuator driving unit 28 for driving a tracking and focusing actuator of the pick-up unit 12 by inputting the tracking and focusing servo control signals generated from the servo unit 18, a spindle motor driving unit 24 for driving a disk spindle motor 26 to rotate the disk by inputting a control signal for driving the spindle motor, generated from the servo unit 18.

A detailed description will be given not to the general system of the optical recording/reproducing apparatus as shown in FIG. 1, but to the pick-up unit 12, the servo unit 18 and sled motor driver 22, which the present invention concerns.

In the system as shown in FIG. 1, the pick-up unit 12 includes a tracking actuator, a focusing actuator, and a sled motor for moving optical tools such as a lens in the arrow direction 31. And the servo unit 18 detects a tracking error and a focusing error from the output signal from the radio-frequency amplifier 14 and then outputs a tracking servo signal and a focusing servo signal, and also outputs a sled servo signal according to the tracking signal or according to a search-controlling signal of a controller 21.

A conventional search unit as shown in FIG. 2, can detect the optical quantity of the ray, by means of photo-diodes (A-F), reflected from the disk 7. The detected signal from photo-diodes (A-F) is applied to an EFM processor through a high frequency amplifier (not shown herein), and analyzed to EFM data. Also in the system, an error detecting signal generated from the photo-diodes (E, F) is applied to the E-F amplifier (2), and amplified.

In a track servo unit 3 receiving the error detecting signal from the E-F amplifier 2, track pick-up operation is carried out owing to the generation of a lens driving signal of the pick-up unit 1. When the drift range a lens of the pick-up unit becomes the maximum value, the output signal of the track servo unit 3 is applied to the sled servo unit 4.

The sled servo unit 4 receiving the output signal from the track servo unit 3 allows the pick-up point to be moved by driving the sled motor of the pick-up unit 1. In order to search a position by measuring the number of tracks moved, the track error signal of the E-F amplifier 2 is applied to the waveform reshaping unit 5 and a square-wave is generated therefrom.

A digital signal processing unit 6, hereinafter called as DSPU) receiving the square-wave, counts the number of the square-waves and measures the target tracks. The track signal measured by counting in the DSPU 6 is applied to the sled servo unit 5 and drives the sled motor of the pick-up unit 1 by means of the track signal, and so resultedly a predetermined position of the target track can be searched.

However, the search unit described above as the prior art has a drawback that, if a beam does not pass over a pit on the disk, the number of tracks can not be counted, and another drawback is that, if the sled motor operates at high speed, the tracking error signal can not be generated.

SUMMARY OF THE INVENTION

It is therefore an object of the present invention to provide a method for searching at high speed the number of tracks without using counter in a digital signal processing unit.

Another object of the present invention is to provide a method for searching with correctness at high speed the number of tracks without malfunction of track-counting due to misrecognition of the pit on a compact disk.

BRIEF DESCRIPTION OF THE DRAWINGS

For a better understanding of the invention and to show how the same may be carried into effect, reference will now be made, by way of example, to the accompanying diagrammatic drawings, in which:

FIG. 3 is a system block diagram according to the present invention;

FIGS. 4A and 4B are schematic diagrams illustrating the composition of the compact disk according of the compact disk according to the present invention;

DETAILED DESCRIPTION OF THE INVENTION

Figure 1:
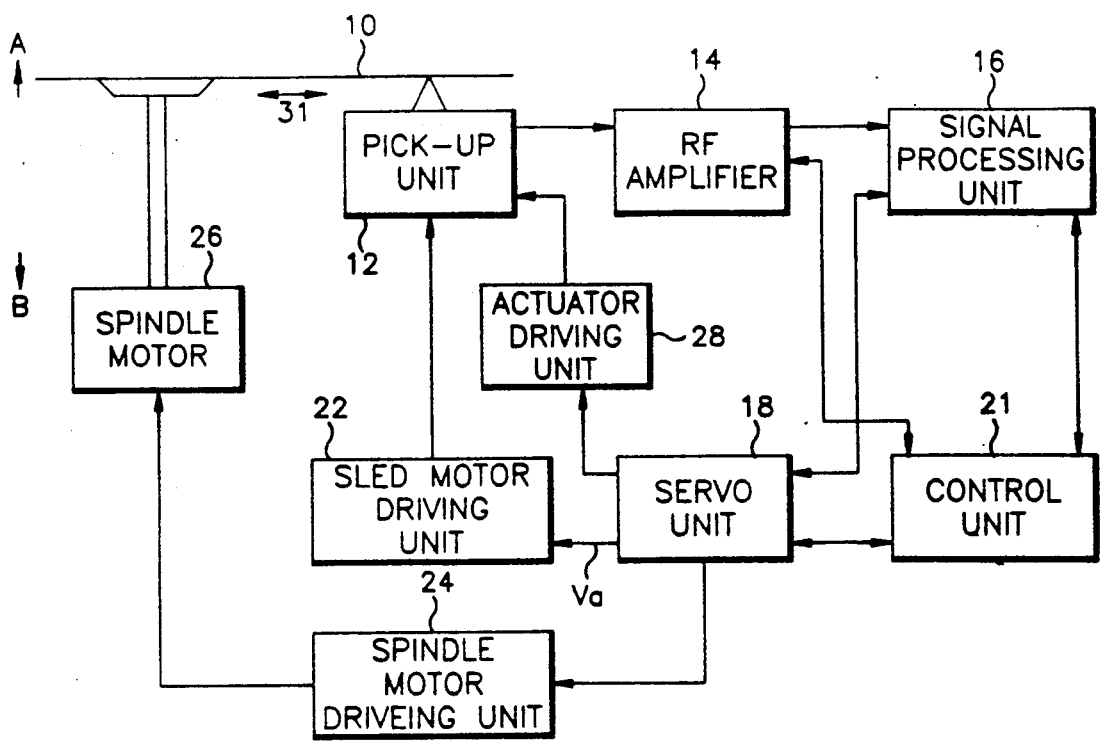
FIG. 1 is a block diagram of an optical recording/reproducing apparatus represented as general composition.
Figure 2:
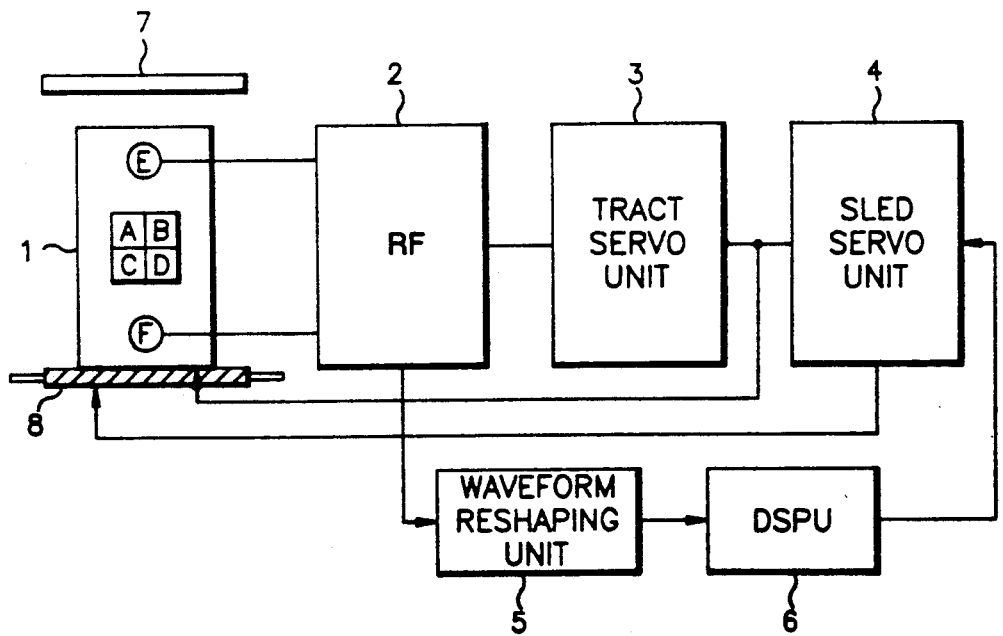
FIG. 2 is a block diagram illustrating a high-speed searching system of an optical recording/reproducing apparatus in the prior art.

Referring to FIG. 3, a system consists of a pick-up unit 10 for picking up a signal from a compact disk, a high frequency amplifier 20 for amplifying the data detected from an optical detector of the pick-up unit 10, a digital signal processing unit 30 for processing the amplified data of the high frequency amplifier 20 with eight to fourteen modulation, an amplifier 40 for amplifying a track error signal generated from the optical detector of the pick-up unit 10, a comparator 50 for comparing the track error signal with a given threshold value, a micro computer system 60 for controlling the system and servo unit 70 for generating a sled motor driving signal by means of the control signal from the micro computer 60.

The row of pits recorded on the compact disk, as shown in FIG. 4A, forms a continuous spiral track towards the outside of the dark. The practical length of one track out of the spiral tracks can be taken with as the next, referring to FIG. 4B which is modified from FIG. 4A so as to measure the practical length. Regarding the size of first track as the reference, there is the interval of 1.6 μm between a starting and terminating point of the spiral line.

Assuming that the number of the spiral strips which are snapped by a unit of $\Delta \phi$ is n, we can see that, $$l_T = l_0 + l_1 + \ldots + l_{n-1}$$

$$l_m = 2\pi \{r + (n \times 1.6/n)\} = 2\pi = r_0 + l\Delta \times (n-1)/2\},$$

where
$l_T$ is the whole length of a track,
$l_m$ is the length of an optical arc,
$r_0$ is the interval between a starting and terminating point,
1.6/n[μm] is equal to 1Δ, and
Δ is equal to an increased radius by 1 $\Delta \phi$.

By means of the equations as the above-mentioned, the number of tracks at the target position can be obtained, and the sign of the interval difference results in a transfer direction and determines how many the track must be moved.

The expansion hereinafter results from converting the number of the moving tracks into a value of time in accordance with velocity.

F is equal to BIL and ma, too. (F=BIL, F=ma)

where
F represents the power,
B represents the intensity of a magnetic field,
I represents the intensity of current,
L represents the length of a conducting wire,
m represents a mass
a represents an acceleration.

Thus, it can be said that, as can be known by BIL=ma, the intensity of current is proportional to the acceleration and resultedly a motion with the equivalent velocity is occurred at the condition of constant current.

And, S(a moved distance) can be marked as $V_o t + (\frac{1}{2})at^2$, the t representing $\sqrt{\{2(S-V_o t)/a\}}$ therein. At this point, as the $V_o$ (an initial velocity) is 0, the t is equal to $\sqrt{(2S/a)}$.

That is, $$S = V_o t + (\tfrac{1}{2})at^2.$$

$$t = \sqrt{\{2(S - V_o t)/a\}}$$

$$t = \sqrt{(2S/a)}$$

Figure 5:
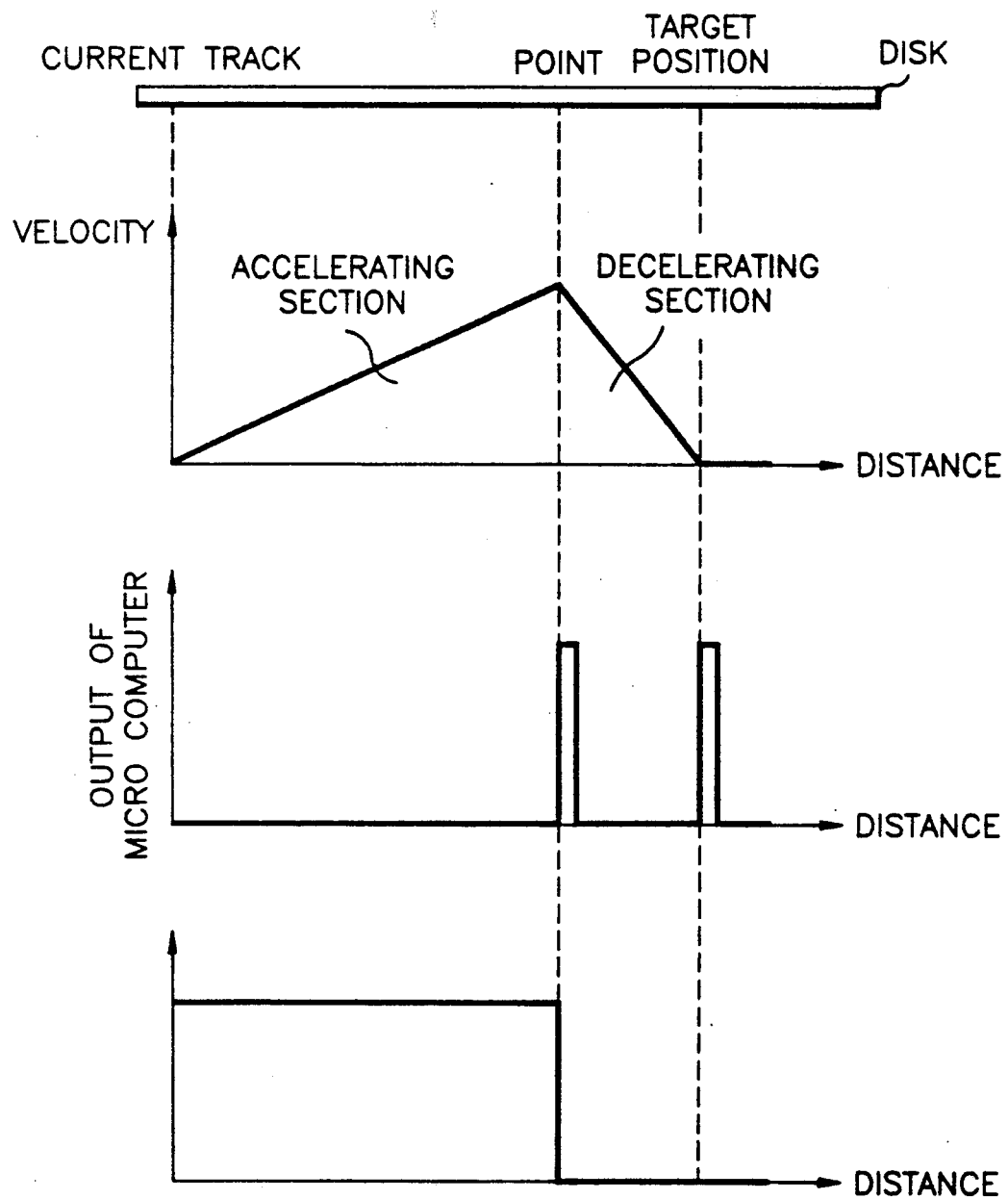
FIG. 5 is a graphic diagram illustrating the shape of the sled motor driving pulse according to the present invention.

As above-mentioned, the target track is searched by means of transferring the number of moving tracks into the value of time according to the velocity. And then, the micro computer 60 drives the sled motor according to the results above, and the driving of the sled motor results in moving of tracks, counting the number of the moving tracks by the output signal generated from the comparator 50. In the processing, the break point by the friction coefficient, as shown in FIG. 5, is set at the point of ¾ which is located within the accelerating section. If the breaking is occurred at the point ¾, the searching is terminated over the position of ¼ to forward direction from said ¾ point of said target position because of reverse-rotation of the sled motor.

Figure 6:
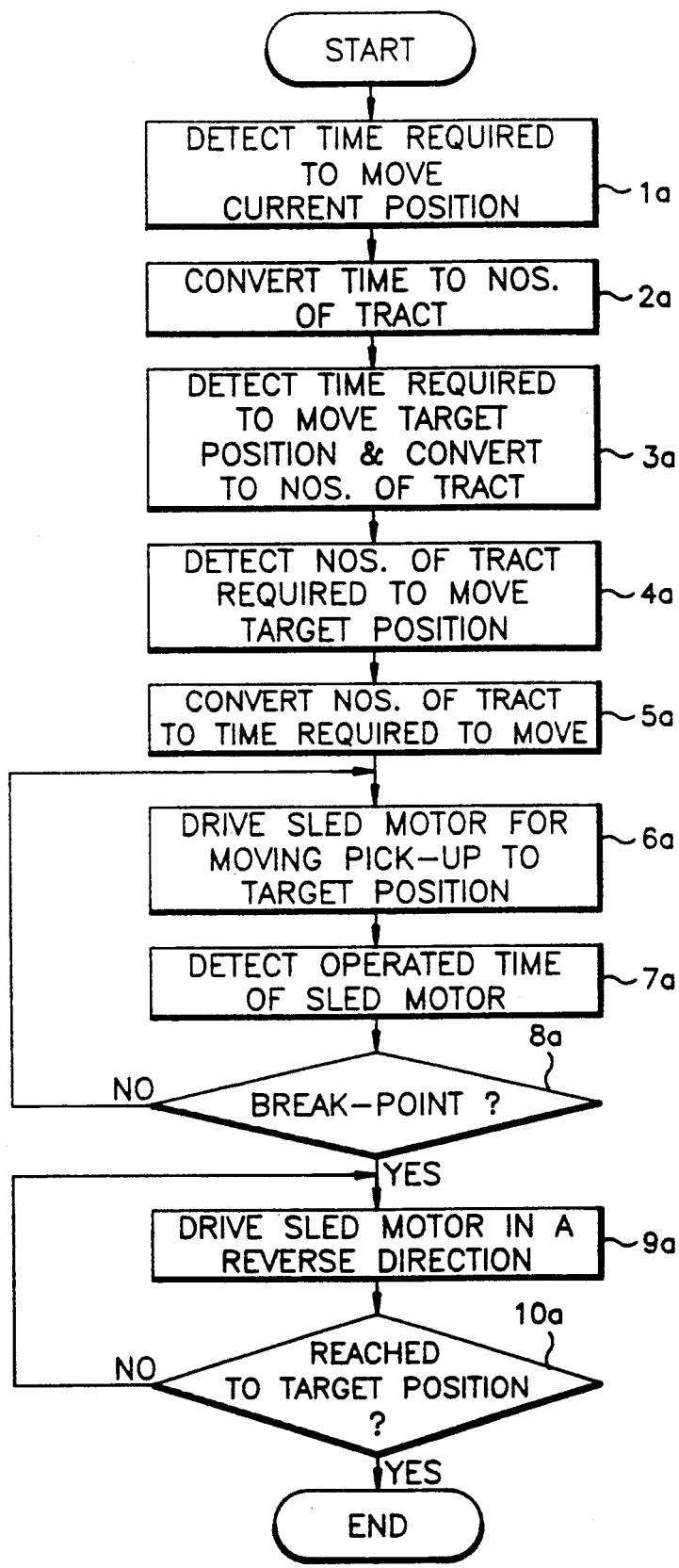
FIG. 6 is a flow chart according to the present invention.

FIG. 6 shows a flow chart according to the present invention, having the first step for converting the detected time to the number of tracks after detecting time required to move current position of the compact disk, second step for converting the detected time to the number of tracks thereby after detecting target track position of the disk, third step for obtaining a value of time from the practical number of moving tracks by means of comparing the numbers of the tracks obtained at the first and second step, fourth step for counting the number of the moved tracks by the sled motor which is activated in accordance with the time value obtained above, fifth step for checking whether the position of the sled motor is at the break point or not, by means of detecting time according to the moved distance of sled motor sixth step for searching a position of the target track by reverse driving the sled motor at the time of the break point.

In accordance with the steps described above, we can explain the flow chart, representing as a flow chart of FIG. 6, according to the present invention. In the step 1a, the micro computer 50 detects time required to move to current position of the pick-up unit on the compact disk from a predetermined reference position. In the step 2a, the time detected by the micro computer 50 is converted to the number of tracks. In the step 3a, the micro computer 50 detects time required to move target position and convert the detected time to the number of track, and then execute a step the 4a. In the step 4a, the number of tracks which must be moved is detected, and the step goes to the step 5a. Consequently in the step 5a, the number of the track necessary to moving is converted to a value of practically moving time, and then, in the step 6a, the sled motor in the servo unit 70 is driven so as to move the pick-up to the position of the target track. In the step 7a, as the next, the operated time of the sled motor is detected by an output signal of the comparator 50. The step 8a executes checking whether the current position of the pick-up moved by operating of the sled motor is at the break point or not, and if not at the break point the step 8a goes to the step 6a again, and if at the break point the sled motor is driven in a contrary direction in the step 9a. After executing the step 9a, in the step 10a whether the pick-up point moved by the sled motor is reached the position of the target track or not yet is checked, and if not reached the step 9a is executed repeatedly, and if reached all the steps for searching is terminated.

As described above, the present invention has an advantage that the accurate searching can be accomplished without malfunction of the track counting due to mis-recognition of the pits, by means of searching at high speed and converting the number of tracks necessary to move into a value of time in accordance with the velocity.

What is claimed is:

1. A method for searching for a track in an optical recording/reproducing apparatus, comprising:
   determining a first time period, said first time period being the time required to drive a sled motor to move a pick-up unit between a current position and a reference position on a compact disk;
   determining a second time period, said second time period being the time required to drive said sled motor to move said pick-up unit between a target position and said reference position on the compact disk;
   comparing the first time period with the second time period to determine a third time period, said third time period being the time required to drive said sled motor to move the pick-up unit from said current position to said target position;
   driving said sled motor in a first direction for time equal to said third time period; and
   searching for the target track at an expiration of said third time period by driving the sled motor.

2. The method for searching for a track, as claimed in claim 1, wherein during said searching for the target track the sled motor is driven in a direction opposite to said first direction.

3. A method for searching a track in an optical recording/reproducing apparatus, comprising:
   determining a first number of tracks between a current position and a reference position on a compact disk;
   determining a second number of tracks between said reference position and a target position on the compact disk;
   calculating a time period required to drive said sled motor to move the pick-up unit from said current position to said target position in response to said first number of tracks and said second number of tracks;
   driving said sled motor in a first direction for said time period; and
   searching for the target track at an expiration of said third time period.

4. A method for searching for a track in an optical recording/reproducing apparatus, comprising:
   detecting a first time period required to move a pick-up between a current position and a reference position on the compact disk and converting said first time period to a first number of tracks;
   detecting a second time period required to move a pick-up between a target position and said reference position and converting said second time period to a second number of tracks;
   comparing said first number of tracks with said second number of tracks and calculating a third time period required to move between said current position and said target position;
   driving a sled motor for a third time period; and
   searching for the target track by driving the sled.

* * * * *

UNITED STATES PATENT AND TRADEMARK OFFICE
CERTIFICATE OF CORRECTION

PATENT NO. : 5,175,716
DATED : 29 December 1992
INVENTOR(S) : Kyoung-Seo MIN

It is certified that error appears in the above-indentified patent and that said Letters Patent is hereby corrected as shown below:

Column 1,

Line 10,     before "transforming", delete "of",

Column 3,

Line 32,     replace "n" (first occurrence) with -- m --,

Line 66,     after "the" (first occurrence), change "$V_0$" to --$V_0 t$--,

UNITED STATES PATENT AND TRADEMARK OFFICE
CERTIFICATE OF CORRECTION

PATENT NO. : 5,175,716
DATED : December 29, 1992
INVENTOR(S) : Kyoung-Seo MIN

It is certified that error appears in the above-indentified patent and that said Letters Patent is hereby corrected as shown below:

Column 5,

Line 27,    before "time", insert -- a --,

Column 6,

Line 1,    after "searching", insert --for--:

Signed and Sealed this

Sixteenth Day of July, 1996

Attest:

BRUCE LEHMAN

*Attesting Officer*     *Commissioner of Patents and Trademarks*